United States Patent
Gerichhausen

(10) Patent No.: US 11,937,034 B2
(45) Date of Patent: Mar. 19, 2024

(54) LOUDSPEAKER SYSTEM

(71) Applicant: HIFIMOTIVE B.V., HA Mill (NL)

(72) Inventor: Dave Gerichhausen, HA Mill (NL)

(73) Assignee: BXM Development B.V., Ha Mill (NL)

( * ) Notice: Subject to any disclaimer, the term of this patent is extended or adjusted under 35 U.S.C. 154(b) by 0 days.

(21) Appl. No.: 18/252,900

(22) PCT Filed: Sep. 21, 2021

(86) PCT No.: PCT/IB2021/058570
§ 371 (c)(1),
(2) Date: May 15, 2023

(87) PCT Pub. No.: WO2022/112870
PCT Pub. Date: Jun. 2, 2022

(65) Prior Publication Data
US 2023/0396906 A1   Dec. 7, 2023

(30) Foreign Application Priority Data
Nov. 24, 2020   (DE) .......................... 102020131094.3

(51) Int. Cl.
*H04R 25/00* (2006.01)
*B60R 11/02* (2006.01)
(Continued)

(52) U.S. Cl.
CPC .......... *H04R 1/025* (2013.01); *B60R 11/0217* (2013.01); *H04R 1/06* (2013.01); *H04R 2400/11* (2013.01); *H04R 2499/13* (2013.01)

(58) Field of Classification Search
CPC ...... H04R 1/025; H04R 1/06; H04R 2400/11; H04R 2499/13
(Continued)

(56) References Cited

U.S. PATENT DOCUMENTS

| | | | | |
|---|---|---|---|---|
| 4,852,178 | A * | 7/1989 | Inkman | H04R 1/025 181/171 |
| 2005/0152569 | A1 * | 7/2005 | Ono | B29C 65/524 156/293 |
| 2018/0295432 | A1 * | 10/2018 | Humphreys | H04R 1/026 |

FOREIGN PATENT DOCUMENTS

| | | | | |
|---|---|---|---|---|
| EP | 1780083 | A1 * | 5/2007 | ......... B60R 11/0223 |
| EP | 3473496 | A1 | 4/2019 | |
| JP | S4847331 | U | 6/1973 | |

OTHER PUBLICATIONS

EP0682460A2. Quick Connection for loudspeakers. Inventor: Stevani. (Year: 1998).*

(Continued)

*Primary Examiner* — Phylesha Dabney
(74) *Attorney, Agent, or Firm* — Greer, Burns & Crain, Ltd.

(57) ABSTRACT

A loudspeaker system including at least one loudspeaker unit, at least one mounting device, wherein the at least one loudspeaker unit is connectable to the at least one mounting device. The at least one mounting device is designed as an overlay, which has at least two countersunk grooves towards the interior, which correspond to protrusions on the exterior of the at least one loudspeaker unit when the overlay receives the at least one loudspeaker unit, wherein the at least two countersunk grooves each have a tangential offset approximately centrally, wherein in the path of the tangential offset there is a latch protrusion which gives the protrusions on the exterior of the at least one loudspeaker unit a tight fit.

10 Claims, 4 Drawing Sheets

(51) Int. Cl.
 *H04R 1/02* (2006.01)
 *H04R 1/06* (2006.01)
(58) Field of Classification Search
 USPC .......................................... 381/386
 See application file for complete search history.

(56) References Cited

OTHER PUBLICATIONS

International Search Report for corresponding International Patent Application No. PCT/IB2021/058570 dated Dec. 13, 2021; priority document.

* cited by examiner

LOUDSPEAKER SYSTEM

CROSS-REFERENCES TO RELATED APPLICATIONS

This application claims the benefit of the International Application No. PCT/IB2021/058570, filed on Sep. 21, 2021, and of the German patent application No. 102020131094.3 filed on Nov. 24, 2020, the entire disclosures of which are incorporated herein by way of reference.

FIELD OF THE INVENTION

The invention relates to a loudspeaker system, comprising at least one loudspeaker unit, at least one mounting device, wherein the at least one loudspeaker unit is connectable to the at least one mounting device.

BACKGROUND OF THE INVENTION

For the installation of loudspeakers in furniture, in motor vehicles or in fixed interior fittings, it is known to make recesses in surfaces that are adapted to the loudspeaker system to be installed. In automotive engineering, it is common to provide prefabricated recesses for loudspeaker systems in the interior door trim or in other individual parts of the vehicle interior. Some vehicle manufacturers provide their own loudspeaker systems for this purpose, which can be installed in the prefabricated standard openings. The installation openings differ from one manufacturer to another. There is no cross-national standard for openings for the installation of loudspeaker systems.

In motor vehicles, the installation of loudspeakers is often prepared by the existing wiring harness. There can be over one hundred different plug and coupling points in a motor vehicle wiring harness.

It is therefore the task of the invention to provide a loudspeaker system that exhibits a high degree of variability and flexibility during installation.

SUMMARY OF THE INVENTION

According to the invention, it is thus provided that the loudspeaker system comprises various individual parts. Thereby, the loudspeaker system comprises at least one loudspeaker unit and at least one mounting device, wherein the at least one loudspeaker unit is connectable to the at least one mounting device. For this purpose, it is possible that the mounting device is constructed as a mounting frame for a plurality of loudspeakers. It is also possible that a plurality of loudspeakers combined as one loudspeaker unit, such as a midrange loudspeaker and a tweeter, and arranged with their centers in alignment one above the other, are accommodated in a mounting frame. Thereby, according to the idea of the invention, it is provided that the at least one mounting device is designed as an overlay, which has at least two countersunk grooves to the inside, which correspond to projections on the outside of the at least one loudspeaker unit, when the overlay receives the at least one loudspeaker unit. In the overlay, the at least two countersunk grooves each have a tangential offset approximately centrally, wherein a latch protrusion is provided in the path of the tangential offset to provide a clamp fit to the protrusions on the exterior of the at least one loudspeaker unit. The loudspeaker unit, which may comprise a single loudspeaker or may comprise more than one loudspeaker, has two tongues, in the sense of a tongue-and-groove connection, or individual projections on the outer circumference in the case of a circular structure of the loudspeaker, which projections engage in the countersunk grooves of the overlay. Within the countersunk groove in the overlay, there is an offset in the plane of the overlay. The tongue on the outer periphery of the loudspeaker unit can be locked in the countersunk groove by twisting the loudspeaker about its own axis within the countersunk groove. In this respect, the insertion of the at least one loudspeaker unit into the overlay resembles a bayonet catch. In fact, however, it is not identical to a bayonet catch because there is no tension spring to hold the insert in the slot of the bayonet catch.

In a first embodiment of the loudspeaker system according to the invention, it is provided that the at least one loudspeaker unit and the at least one mounting device are of circular design in the region of the overlay. Due to the circular embodiment, it is possible to fix the loudspeaker within the mounting device by twisting. Alternatively, it is also possible to make the overlay and the loudspeaker rectangular. For locking, the loudspeaker unit can then be moved within the overlay instead of being twisted, and this as far as the offset in the countersunk groove allows.

In an embodiment of the invention, it may be provided that the at least one mounting device is connectable to the at least one loudspeaker unit from the front as well as from the rear. Thus, the loudspeaker unit may be lowered into the overlay from the front, where "front" is the side of the loudspeaker unit facing the listener. Alternatively, it is also possible for the overlay to be inserted from the back of circumference of the loudspeaker unit from behind, where "behind" is the side of the loudspeaker unit facing away from the listener when the loudspeaker unit is used as intended.

In an embodiment of the invention, the tangential offset in the countersunk groove may be long enough to allow the protrusions on the outside of the at least one loudspeaker unit to move over the latch protrusion when engaged in the overlay. As a result, the clamp fit is again removed and the spring or projection on the loudspeaker unit is trapped in the offset.

Due to the way the entire loudspeaker system is constructed, it is possible to combine a loudspeaker, which has a significantly higher cost in production than other assembly parts, with various assembly elements. For example, one assembly insert can be created per vehicle make and combined with standardized loudspeaker units. The quality of the loudspeaker units can also vary. Very high-quality loudspeaker units with a very pure sound can be installed, but also loudspeaker units with a less high-quality sound and thus usually lower costs.

However, the loudspeaker systems to be installed not only have to satisfy different installation frames and positions, but also different electrical installation conditions. Since it is not uncommon for automotive wiring harnesses to have more than 100 different end points with connectors that deliberately have different shapes, it is not uncommon for each loudspeaker to have a very individual electrical plug contact type between different vehicle models or different vehicle brands. Varying the shape of the plug contacts is therefore undertaken in order to achieve uniqueness in the cable assignment. Due to the complexity of the cable harnesses, it is hardly possible to trace the course of each individual cable with a reasonable amount of time. Instead, the approach is that each connector fits like a key into the corresponding plug contact. To accommodate this large number of variants, in an embodiment of the invention it can be provided that at least one receptacle socket is present on the at least one loudspeaker unit, within which at least one stud bolt in the form of a wire pin is present as an electrical contact, the at least one receptacle socket corresponding to a bushing insert, socket insert, or receptacle insert which has an opening in the region or area of the stud bolt positioned to receive the stud bolt. The bushing insert acts like a lock cylinder that is inserted into an existing lock. The opening in the bushing insert has a shape that corresponds to the electrical plug contact in the existing cable harness. Due to the separation between the bushing insert and the receptacle, bushing inserts with a wide variety of shapes can be manufactured inexpensively and connected to the loudspeaker unit. Thus, for each type of vehicle that has a predetermined connector architecture, a bushing insert individualized for the vehicle type can be selected.

In order to connect the male insert to the female receptacle as inexpensively and quickly as possible, it can be provided in an embodiment of the invention that the male insert has at least one latching projection which corresponds to a latching opening in each of the at least one female receptacle. For fastening, the bushing insert is pushed once into the female receptacle, whereby the bushing insert, which is made of plastic, deforms slightly elastically until the latching projection engages in the latching opening and the receiving bushing deforms elastically back.

Depending on the type of plug, it may be necessary for the orientation of the bushing insert to be aligned in a certain direction to the loudspeaker unit. This is particularly the case for male connectors or fixed multiple connectors that are adapted to the shape of the loudspeaker. According to a further embodiment of the invention, in order to standardize the orientation of the bushing insert, it may be provided that on the inner side of the at least one female receptacle there is a guide projection or guide groove which corresponds to a guide groove or guide projection on the outer side of the bushing insert.

In a further embodiment of the invention, in order to provide an ornamental cover or a protective cover for the sensitive loudspeaker diaphragm, it may be provided that a loudspeaker grille is insertable between the loudspeaker unit and the cover and extends over the area of a loudspeaker diaphragm of the at least one loudspeaker unit. The loudspeaker grille may comprise individual spokes over which a textile is stretched. However, it is also possible to use a regular or patterned perforated sheet perforated in two dimensions.

The loudspeaker system presented here can be sold individually consisting of the loudspeaker unit, mounting device as a cover and socket inserts and, if necessary, also the loudspeaker grille. However, it is also possible to sell higher-quality loudspeaker systems as a set comprising the loudspeaker unit and more than one mounting device and/or more than one socket insert for installation in different motor vehicles.

BRIEF DESCRIPTION OF THE DRAWINGS

The invention is explained in more detail with reference to the following FIGS. It shows.

DETAILED DESCRIPTION OF THE PREFERRED EMBODIMENTS

Figure 1:
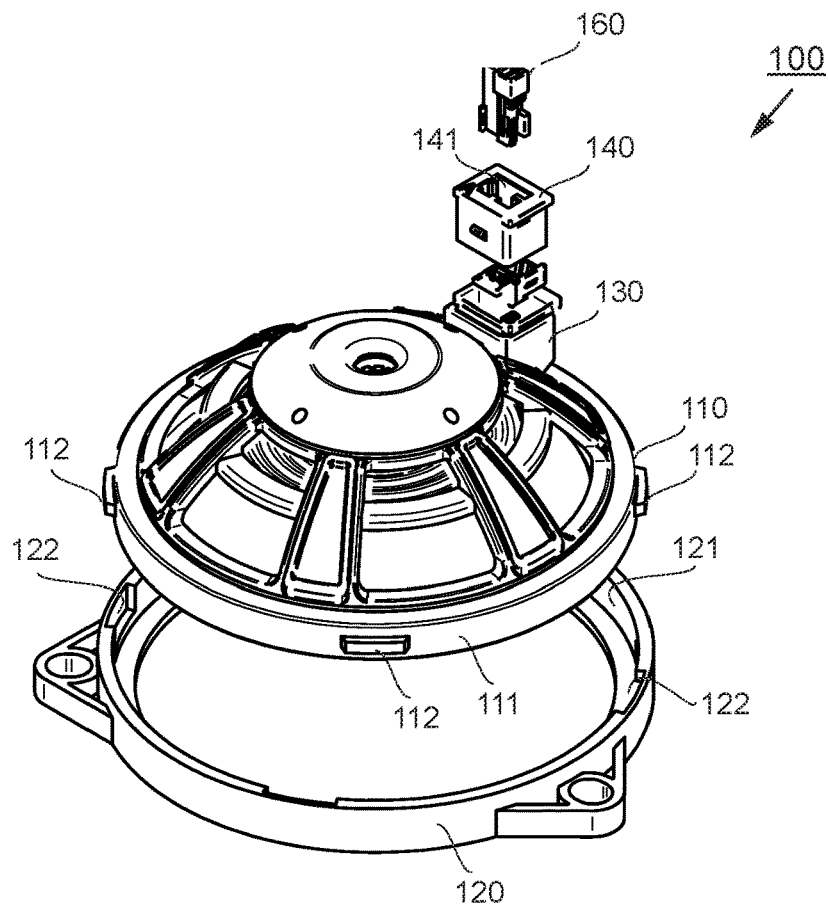
FIG. 1 shows a loudspeaker system according to the invention in a perspective view from behind, the side facing away from the listener.

In FIG. 1, a perspective exploded view of a loudspeaker system 100 according to the invention is shown in a view from the rear, i.e., the side facing away from the listener. The loudspeaker system 100 comprises at least one loudspeaker unit 110. It is also possible that more than one loudspeaker is arranged concentrically and one above the other in a loudspeaker unit 110, or also that more than one loudspeaker is accommodated in a common mounting device 120. Further, the loudspeaker system 100 comprises the at least one mounting device 120. The at least one loudspeaker unit 110 is connectable to the at least one mounting device 120. According to the present embodiment of the loudspeaker system 100, a mounting device 120 is configured as an overlay. This overlay has three countersunk grooves 122 towards the interior 121, which correspond to protrusions 112 on the exterior 111 of the loudspeaker unit 110 shown here, and specifically when the overlay receives the at least one loudspeaker unit 110. The three countersunk grooves 122 each have a tangential offset 123 approximately centrally, wherein a latch protrusion 124 is provided in the path of the tangential offset 123, which protrusion gives the protrusions 112 arranged on the exterior 111 of the at least one loudspeaker unit 110 a clamp fit when the connection is made as intended here in this embodiment. The latch protrusion 124 is explained in more detail in the following figures.

The variant of the loudspeaker system 100 shown here is further equipped with a receptacle 130 on the loudspeaker unit 110. In this receptacle 130, at least one stud bolt 131 in the form of a wire pin is present in the opening as an electrical contact. Depending on the type of loudspeaker, there may be only a single contact that operates against ground, a metallic frame of the loudspeaker. However, it is also possible to accommodate ground-free contacts and to arrange two electrical poles as contact pins for each individual loudspeaker of the loudspeaker unit 110. The receptacle 130 corresponds to a receptacle insert 140, which itself leaves an opening 141 in the area of the stud bolt 131 positioned to receive the stud bolt. A corresponding plug contact 160 of a cable harness fits into this opening 141, whereby only the plug contact is shown here, but not the cables of the cable harness.

Figure 2:
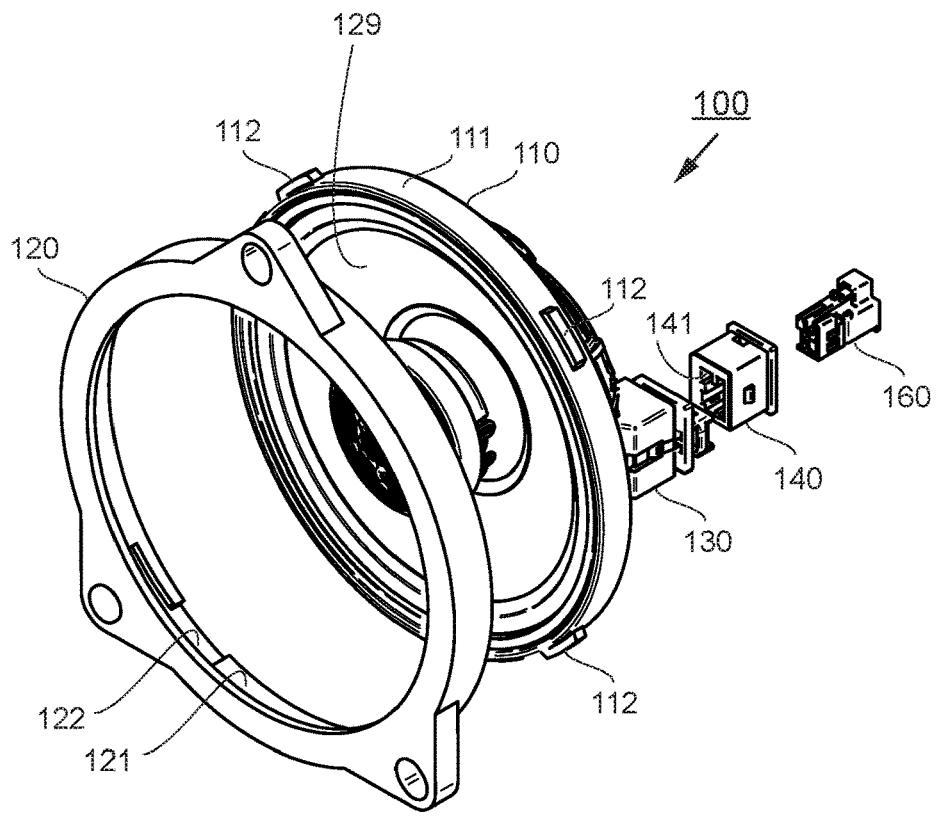
FIG. 2 shows a perspective view of a loudspeaker system according to the invention from the front, the side facing the listener.

In FIG. 2, to illustrate all the features in FIG. 1, the same loudspeaker system 100 is shown in a perspective view from the front, i.e., the side facing the listener, in an exploded view. The figure description for FIG. 1 is also to be read onto this FIG. 2.

Figure 3A:
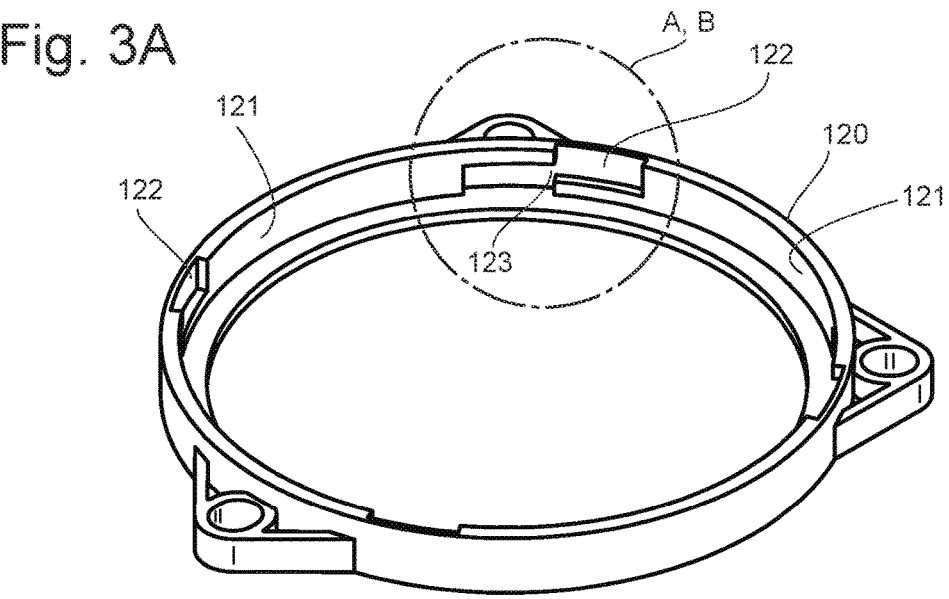
FIG. 3A shows a mounting device as a cover from the loudspeaker system according to the invention with highlighted detail A, B.
Figure 3B:
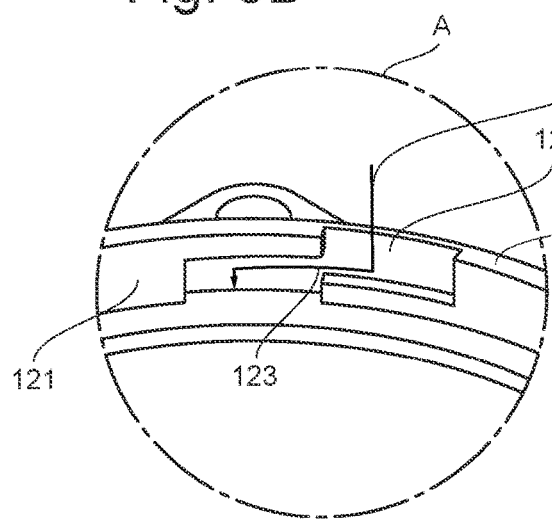
FIG. 3B shows detail A from FIG. 3A.

In FIG. 3A, a mounting device 120 is shown as an overlay from the loudspeaker system 100 according to the invention with detail A, B highlighted. The view shown here is centered on a countersunk groove 122, detail A, B on the interior 121 of the mounting device 120. The countersunk nut 122 is open on the side facing up. The protrusions 112 of the loudspeaker unit 110 are inserted into this opening of the countersunk groove 122, which is located here at the top, when connecting to the loudspeaker unit 110. A tangential offset 123 of the countersunk groove 122 is provided at the bottom of the first step of the countersunk groove 122. Once a protrusion 112 has reached the bottom of the first stage, the loudspeaker unit 110 can be rotated in the mounting device 120 in the direction of the tangential offset, which is in the plane of the overlay. The path of a protrusion 112 on the loudspeaker unit 110 is highlighted in detail A in FIG. 3B. Arrow P shows the path of a protrusion 112 on the loudspeaker unit 110 in the countersunk groove 122, which first starts with a vertical downward movement, then turns in a tangential direction, and then goes down again in a vertical direction when the offset 123 is far enough. It is also possible that the offset 123 is only short enough that the second vertical downward movement does not occur. The embodiment shown here is constructed such that the countersunk grooves 122 are arranged on the inner side of the overlay, and that the protrusions 112 are arranged on the outer periphery of the loudspeaker unit 110. However, according to the idea of the invention, it is also possible that the structure is inverted for this purpose. Thus, it may be provided that the protrusions 112 are arranged on the inner side of the overlay and that the countersunk grooves 122 are arranged on the exterior 111 of the at least one loudspeaker unit 110.

Figure 3C:
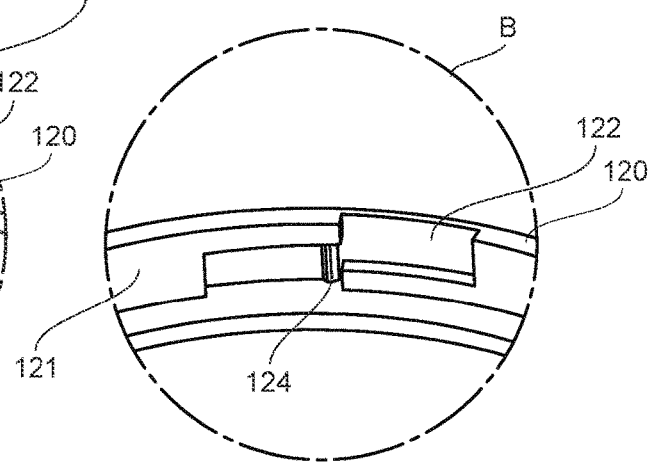
FIG. 3C shows detail B showing the embodiment of the assembly device according to the invention in the corresponding set from FIG. 3A, FIGS. 4A-4C show three views of a socket insert of the loudspeaker system according to the invention.

FIG. 3C shows a detail B according to the invention. The countersunk groove 122 has a latch protrusion 124. Depending on the length of the offset 123, it is possible that the latch protrusion 124 leads to a clamping fit of a protrusion 112 on the loudspeaker unit 110, whereby the loudspeaker unit is fixed. In the case of a longer offset 123, it is also possible that a protrusion 112 on the speaker unit 110 is pushed over this latch projection 124 and is trapped in the offset 123.

Figure 4A:
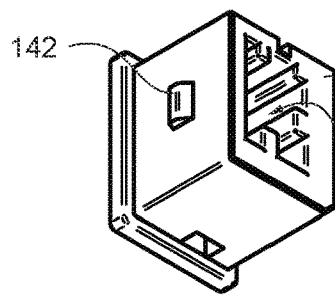
FIGS. 4D-4F show three views of the opening of different socket inserts for different plug contacts.
FIG. 4G shows how the socket insert according to FIGS. 4A-4F is combined with the loudspeaker system.
Figure 4B:
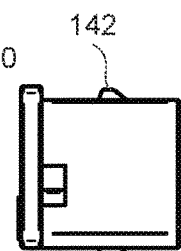
Figure 4C:
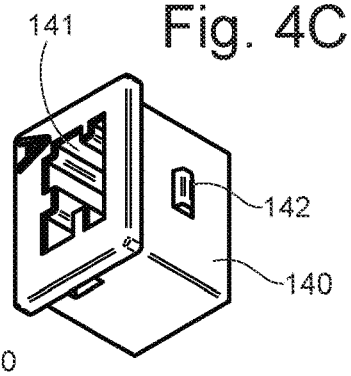
Figure 4D:
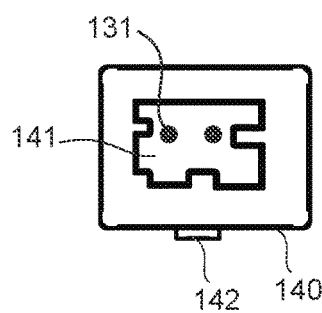
Figure 4E:
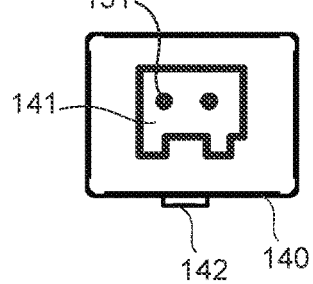
Figure 4F:
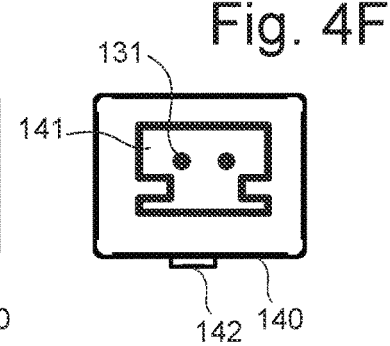

FIGS. 4A-4C show three views of a receptacle insert 140 of the loudspeaker system 100 according to the invention. FIGS. 4D-4F show three views of the openings of different receptacle inserts 140 for various plug contacts 160. The receptacle inserts 140 behave similarly to locking cylinders in a lock. To this end, the socket inserts 140 themselves have differently shaped openings 141, which form a positive fit with the shape of, for example, a plug contact 160 specific to a vehicle type and correspond with this plug contact 160. In order to secure the receptacle insert 140 in a receiving socket 130 on the loudspeaker unit 110, one or more latch protrusion 142 may be present on the outer side of the receptacle insert 140, each engaging in a corresponding latch opening 132 of the receptacle 130. The opening 141 typical for the plug contact type leaves space for stud bolts 131 present in the receptacle 130, which are in the form of a wire pin at the bottom of the receiving socket 130.

Figure 4G:
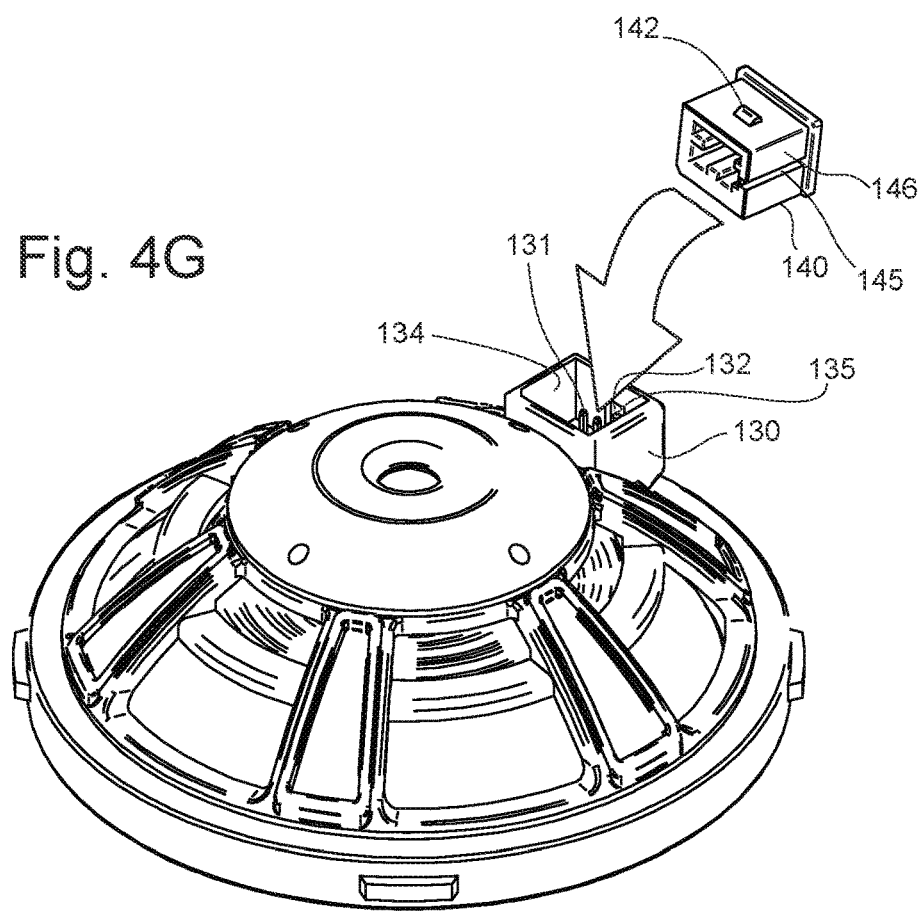

FIG. 4G illustrates how the receptacle insert 140 shown in FIGS. 4A-4F is united with the loudspeaker unit 110. The wide arrow shows how a receptacle insert 140 is inserted into the receptacle 130. In this embodiment, the receptacle insert 140 has a guide groove 145 on the outside, which cooperates with a guide protrusion 135 on the inside of the receiving receptacle 130, so that the receptacle insert 140 can be inserted into the receiving receptacle 130 in only one way.

Figure 5:
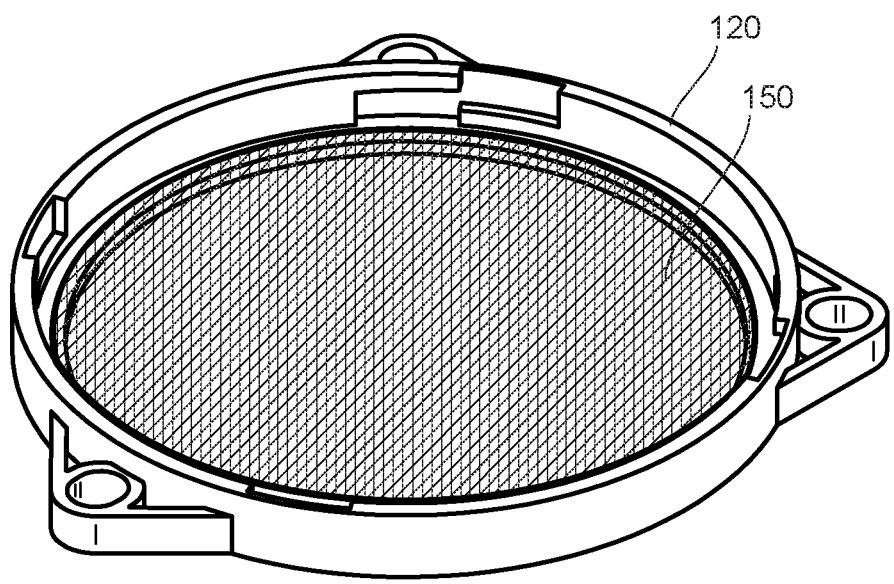
FIG. 5 is a diagram demonstrating the use of a protective or decorative loudspeaker grille for the membrane of the loudspeaker unit.

Finally, FIG. 5 shows another detail to illustrate how a protective or decorative speaker grille 150 for the loudspeaker diaphragm 129 of the loudspeaker unit 110 can be inserted into the mounting device 120. In this case, the protective or decorative speaker grille 150 is inserted into the mounting device, which is designed as a cover, and then the loudspeaker unit 110 is inserted into the cover so that the protective or decorative speaker grille 150 is clamped between the cover and the loudspeaker unit 110.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST 100 loudspeaker system
110 loudspeaker unit
111 exterior
112 protrusion
120 mounting device
121 interior
122 countersunk groove
123 offset
124 latch protrusion
129 loudspeaker diaphragm
130 receptacle
131 stud bolt
132 latch opening
134 inside
135 guide protrusion
140 receptacle insert
141 opening
142 latch protrusion
145 guide groove
146 exterior
150 speaker grille
160 plug contact
A detail
B detail
P arrow

The invention claimed is:

1. A loudspeaker system, comprising
at least one loudspeaker unit,
at least one mounting device,
wherein the at least one loudspeaker unit is connectable to the at least one mounting device,
wherein the at least one mounting device is configured as an overlay having at least two countersunk grooves towards an interior corresponding to protrusions on an exterior of the at least one loudspeaker unit when the overlay accommodates the at least one loudspeaker unit,
wherein the at least two countersunk grooves each have a tangential offset centrally, wherein in a path of the tangential offset there is a latch protrusion which provides a clamp fit to the protrusions on the exterior of the at least one loudspeaker unit,
wherein at least one receptacle is provided on the at least one loudspeaker unit, within which receptacle at least one stud bolt formed as a pin is provided as an electrical contact, the at least one receptacle corresponding to a receptacle insert which has an opening in a region of the stud bolt.

2. The loudspeaker system according to claim 1, wherein the at least one loudspeaker unit and the at least one mounting device are circular in the region of the overlay.

3. The loudspeaker system according to claim 1, wherein the at least one mounting device is connectable to the at least one loudspeaker unit in a forward direction as well as in a rearward direction.

4. The loudspeaker system according to claim 1, wherein the tangential offset is long enough to allow the protrusions on the exterior of the at least one loudspeaker unit to move over the latch protrusion.

5. The loudspeaker system according to claim 4, wherein the receptacle insert has at least one latch protrusion, which corresponds to a latch opening in each of the at least one receptacle.

6. The loudspeaker system according to claim 5, wherein on an inner side of the at least one receptacle there is a guide protrusion or a guide groove corresponding to a guide groove or a guide protrusion on the outer side of the receptacle insert.

7. The loudspeaker system according to claim 1, wherein between one of the at least one loudspeaker unit and the at least one mounting device a speaker grille is insertable, which extends over a surface of a loudspeaker membrane of the at least one loudspeaker unit.

8. The loudspeaker system according to claim 1, wherein the protrusions are arranged on an inner side of a cover and the countersunk grooves are arranged on the exterior of the at least one loudspeaker unit.

9. A loudspeaker system set, comprising,
at least one loudspeaker system according to claim 1, and
at least two mounting devices of different shapes on the exterior of the at least one loudspeaker unit.

10. A loudspeaker system set, comprising,
at least one loudspeaker system according to claim 5, and
at least two bushing inserts, each of which has a different internal shape of the opening from the other.

* * * * *